United States Patent [19]

Shannon et al.

[11] 3,894,295

[45] July 8, 1975

[54] SOLID STATE IMAGE DISPLAY AND/OR CONVERSION DEVICE

[75] Inventors: John Martin Shannon; John Ernest Ralph, both of Salfords, near Redhill, England

[73] Assignee: U.S. Philips Corporation, New York, N.Y.

[22] Filed: Sept. 18, 1973

[21] Appl. No.: 398,480

[30] Foreign Application Priority Data

Sept. 22, 1972 United Kingdom............... 43958/72
Sept. 22, 1972 United Kingdom............... 43956/72
Aug. 16, 1973 United Kingdom............... 43957/73

[52] U.S. Cl. ....................... 357/19; 357/22; 357/17; 357/15; 357/52; 307/311; 357/30

[51] Int. Cl. ........................................... H01l 15/00

[58] Field of Search..... 317/235 N, 235 A, 235 VA; 250/211 J, 213; 307/311; 357/22, 30, 17, 15, 357/52; 311/311; 357/19

[56] References Cited

UNITED STATES PATENTS 3,512,041 5/1970 Dalmasor........................... 315/169
3,721,839 3/1973 Shannon............................ 307/304

*Primary Examiner*—Martin H. Edlow
*Attorney, Agent, or Firm*—Frank R. Trifari; Jack Oisher

[57] ABSTRACT

An image intensifier or converter is described comprising an array of JFETs having separate gates which when pulsed block the channel of the associated JFET. Each JFET is connected in series with a display element, such as an electroluminescent diode. Incident imaging photons absorbed in the channel regions unblock the associated FET causing radiation emission from the associated display element.

13 Claims, 8 Drawing Figures

SOLID STATE IMAGE DISPLAY AND/OR CONVERSION DEVICE

This invention relates to an image display and/or conversion device comprising an array of field-effect transistor structures with an individual display element electrically in series with the source and/or drain of each transistor.

Image intensifier devices utilising electric field-effect section are described in British Pat. No. 1201374 and British Pat. No. 1202049. These devices are unsatisfactory in many applications because they have either low speed of response, or require optical resetting, or in some instances a low pressure ambient.

It is an object of the invention to provide a solid state image display and/or conversion device having appreciable gain and in which the aforesaid disadvantages are at least partly mitigated.

The invention provides an image display and/or conversion device comprising an array of junction field-effect transistor structures having separate gates for producing depletion regions within the channels of said transistor structures and with a display element electrically in series with the source and/or drain of each transistor structure, the array of structures being arranged such that radiation in the form of an image directed from outside the array can generate charge carriers in said depletion regions or within a diffusion length of said depletion regions.

The gate junction of each transistor structure may be formed by a p-n junction in the form of a homojunction between regions of different conductivity type but of the same semiconductor material, or may be formed by a rectifying heterojunction between different semiconductor materials. The gate junction may alternatively be formed by a metallic contact on the material of the channel of the transistor structure to form a junction of the Schottky barrier type.

Preferably a common addressing conductor is provided for all the gates, said conductor being coupled to each gate via an individual barrier against charge leakage from the gate to the conductor. Each such barrier may be formed by a capacitor or a rectifying junction in the form of a p-n homojunction, a hetero junction or a Schottky barrier junction.

Each display element may, for example, comprises a.c. or d.c. electro-luminescent material or an electroluminescent diode formed by a forward-biased p-n junction or a reverse-biassed Schottky junction. As an alternative it may be of the liquid-crystal type. The display elements may form a continuous display screen.

Embodiments of the invention will now be described, by way of example, with reference to the accompanying diagrammatic drawings in which.

Figure 1:
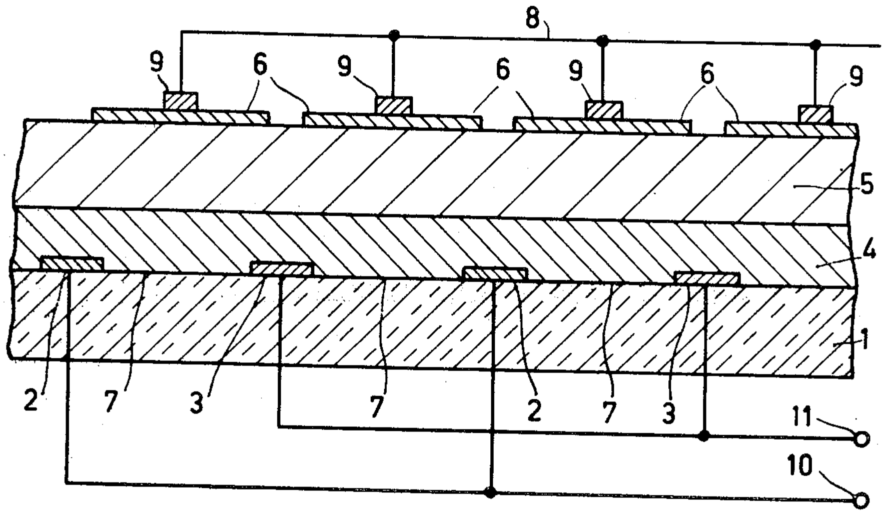
FIG. 1 is a cross-section (not to scale) of part of a first image conversion and display device in which electrical conduction occurs in the lateral direction.

In FIG. 1 the upper surface of a glass support plate 1 is provided with interdigitated transparent electrode strips 2,3 of tin oxide which extend into the plane of the paper. The stripes 2,3 may be on 20 mil. centers and be 10 mils. wide. As is shown diagrammatically, alternate strips 2 are electrically interconnected, as are alternate strips 3. The strips 2,3 contact a layer 4 of electroluminescent material, for example suitably doped ZnS in an epoxy resin binder. The layer 4 may be about 2 mils. thick and, after curing, is covered with a layer 5 of (n-type) zinc oxide powder in a styrene-butadiene copolymer binder, which may be about 1 mil. thick.

On the top of layer 5 are provided semi-transparent strips 6 of p-type material such as $Cu_2S$. These strips extend into the plane of the paper and each covers at east the gap 7 between a strip 2 and a strip 3 and preferably also overlaps part of the corresponding strips 2 and 3 as shown. The strips 6 are subdivided parallel to the plane of the paper into substantially square elements of a size which is appropriate for the required resolution, and all the elements are provided with a common addressing conductor 8 (shown diagrammatically; it may in practice be provided on an insulating layer provided over the top surface of the layer 5 and strips 6) which is coupled to each element of each strip 6 via an individual Schottky barrier rectifying junction formed by a metal contact pad 9. The metal of each pad 9 may be provided in a window in the aforementioned insulating layer, if present.

In operation an a.c. voltage is applied between terminals 10 and 11 and thus between the alternate strips 2 and 3 which form the source and drain connections of individual field-effect transistor structures, conduction occurring between an adjacent pair of strips 2 and 3 via the semiconductor layer 5 (layer 4 being much thinner than the separation between adjacent strips 2 and 3 and thus having a much smaller resistance in its thickness direction than directly between each pair of adjacent strips 2 and 3.) The addressing line 8 is pulsed negatively relative to the strips 2 and 3, thereby charging the elements of the strips 6, each of which forms a p-n hetero-junction gate for a field-effect transistor structure the source and drain connections of which are formed by the strips 2 and 3 the gap between which is covered by the corresponding element. The charge on each gate 6 (which cannot leak away when the pulse on the line 8 is removed because the Schottky barrier formed by the junction between the corresponding pad 9 and gate 6 becomes reverse-biased) produces a depletion region extending across the underlying part of the layer 5, thereby pinching off the conduction path between the corresponding strip 2 and strip 3 at that region. Substantially no current therefore flows through the electroluminescent layer 4 and the display viewed through the glass support plate 1 is therefore uniformly dark.

If now an input radiation image is incident on the upper face of the device and the incident radiation is such that it can penetrate to and be absorbed in the depletion regions of the heterojunction gate contact 6 or within a diffusion length thereof, electron/hole pairs will be generated at a rate proportional to the input radiation intensity, and the resulting charge carriers in the depletion regions will partially neutralise the charges on the corresponding gates. The corresponding depletion regions therefore contact and conduction occurs between the corresponding strips 2 and 3 at points where radiation is incident, resulting in light output from the corresponding parts of the electroluminescent layer 4, the intensity of which is substantially proportional to the intensity of the incident radiation at this region. It will be noted that the device is capable of integrating the effect of the input radiation, exposure thereto for a longer time resulting in increased contraction of the depletion layers and enhanced radiation from the corresponding parts of the layer. The device can be reset for a new exposure by applying another negative pulse to the line 8, prior to which the device can store the image.

It will be appreciated that, if the material of the layer 5 waere sensitive to the radiation emitted by the material 4, positive optical feedback would occur between the two. It should therefore be ensured that this is not the case or, if it is the case, an opaque layer of suitable conductivity (not shown) should be provided between the layers 4 and 5 as a screen.

The radiation to which the device is responsive and that which is emitted thereby is determined inter alia by the materials of the layers 4 and 5. The device may therefore be "tailored" to different input and output radiations by suitably choosing the material of the layers 4 and 5.

Figure 2:
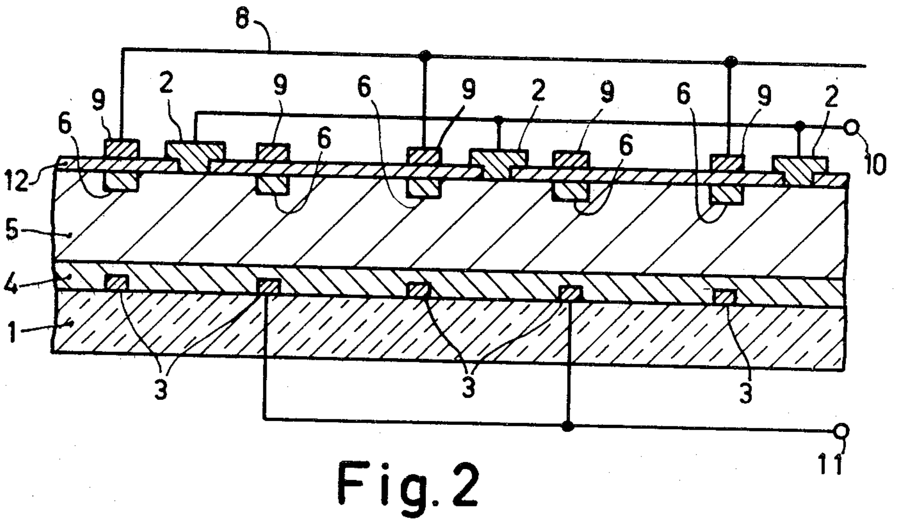
FIG. 2 is a cross-section (not to scale) of part of a second conversion and display device in which electrical conduction occurs in the thickness direction.

In FIG. 2 corresponding components have been given, as far as possible, corresponding reference numerals to their counterparts in FIG. 1.

The device shown in FIG. 2 comprises a single crystal layer 5 of n-type silicon having on its lower surface a deposited layer 4 of electroluminescent material such as zinc sulphide doped with copper and manganese. An array of annular electrodes 3, for example of transparent tin oxide, together insulated electrical conductors interconnecting them (shown diagrammatically as a lead terminated at 11) are present at the surface of the layer 4 and form ohmic connections thereto. If desired transparent conductive material may also extend within each annulus 3; it may be thinner than the surrounding annulus 3 to allow optimum transmission of output radiation therethrough. Annular P+ regions 6 are provided by diffusion in the upper surface of the n-type silicon layer 5, these regions being coaxial with the electrodes 3 and forming gate junctions with the layer 5. The assembly of the silicon layer 5 having the deposited layer 4 thereon and the electrodes 3 together with the interconnections of said electrodes is supported by a glass plate 1.

A thin insulating layer 12 is provided over the top surface of the silicon layer 5 and covers the p+ regions 6, this layer 12 having a window coinciding with the common axis of each region 6 and underlying electrode 3. Metallic contacts 2 and 9, for example of gold, are deposited on the layer 12, the contacts 2 being of substantially circular outline and contacting n+ surface drain regions of the layer 5 through the windows in the layer 12, and the contacts 9 being of substantially c-shaped outline and overlying but insulated from the diffused regions 6. Thus each gate electrode region 6 has an MOS storage capacitor in series therewith. The contacts 9 are all interconnected by means of conductors deposited on the layer 12 and depicted diagrammatically as a conductor 8, the contacts 2 being similarly interconnected by conductors depicted diagrammatically terminating at 10.

In operation a voltage is applied between terminals 10 and 11 and thus between each pair of contacts 2 and 3 which form the drain and source connections respectively of individual junction field-effect transistor structures, the gates of which are formed by the annular diffused regions 6. A portion of the electroluminescent layer 4 is electrically in series with the source-drain path 3, 5, 2 of each transistor structure and thus luminesces if the corresponding transistor conducts.

Initially the gate addressing line 8 is pulsed positively, tending to deposit positive charge on the gates 6 via the capacitors formed by the closed proximity of the contacts 9 and gates 6. However this would drive the junction between each region 6 and the layer 5 into conduction. Thus the regions 6 remain at their original potentials and the capacitors charge instead. At the end of the positive pulse the contacts 9 return to zero potential, depositing negative charge on the regions 6 because the capacitors cannot discharge (the junctions between the regions 6 and the layer 5 become reverse-biased). A depletion region is therefore formed below each region 6 and extending through the layer 5 thus pinching off the axial current path from the corresponding source 3 to the corresponding drain 2. Substantially no current therefore flows through the electroluminescent layer 4 and the display viewed through the glass support plate 1 is therefore uniformly dark.

As described above the reference of FIG. 1, if now an input radiation image is incident on the upper face of the device and the incident radiation is such that it can penetrate to and be absorbed in the the depletion regions of the gates 6 or within a diffusion length of said depletion regions the electron/hole pairs generated will partially neutralise the charges on the corresponding gates. The corresponding depletion regions therefore contract and conduction occurs between the corresponding source connection 3 and drain connection 2 at points where radiation is incident, resulting in light output from the corresponding parts of the electroluminescent layer 4, the intensity of which is substantially proportional to the intensity of the incident radiation at this region. It will be noted that again the device is capable of integrating the effect of the input radiation, exposure thereto for a longer time resulting in increased contraction of the depletion regions and enhanced radiation from the corresponding parts of the layer 4. The device can be reset for a new exposure by applying another positive pulse to the line 8.

Capacitive addressing of the gates 6 similar to that described with reference to FIG. 2, may also be employed in the device of FIG. 1, providing the construction is suitably modified, and similarly the addressing of the gates by means of rectifying junctions described with reference to FIG. 1 may also be employed with the device of FIG. 2. It should be noted that, with the conductivity types for the materials described, a positive resetting pulse is required when capacitive addressing is employed whereas a positive or negative resetting pulse is required when the addressing is via rectifying junctions. If desired the series capacitors for the gates of FIG. 2 may be formed by reverse-biased diodes.

Although the display elements described are defined electrically in a continuous layer of electroluminescent material, it will be obvious that other types of electrical and geometrical definition of display elements may alternatively be employed. They may be formed, for example, by individual luminescent forward-biased p-n junctions or reverse-biased Schottky junctions or by a so-called liquid-crystal. Examples of the two former will be described with reference to FIGS. 3 to 8.

Figure 3:
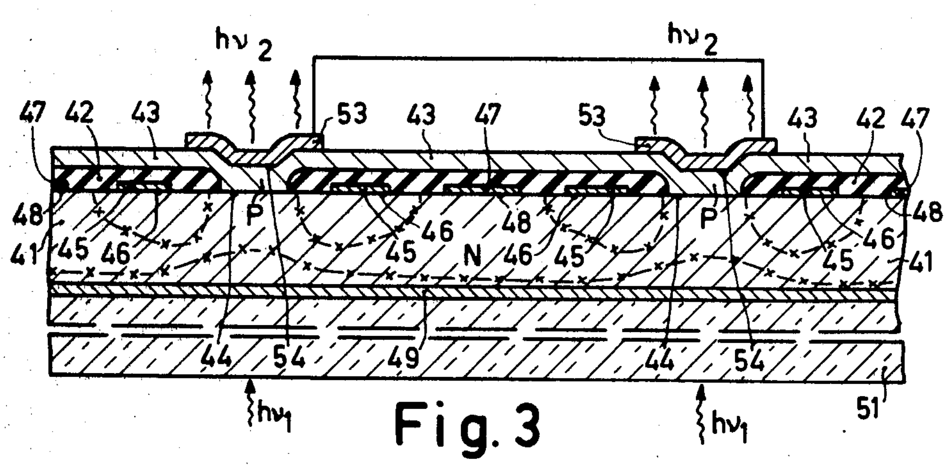
FIGS. 3 and 4 show a cross-section and a plan view respectively (not to scale) of a third conversion and display device in which conduction occurs in the lateral direction.
Figure 4:
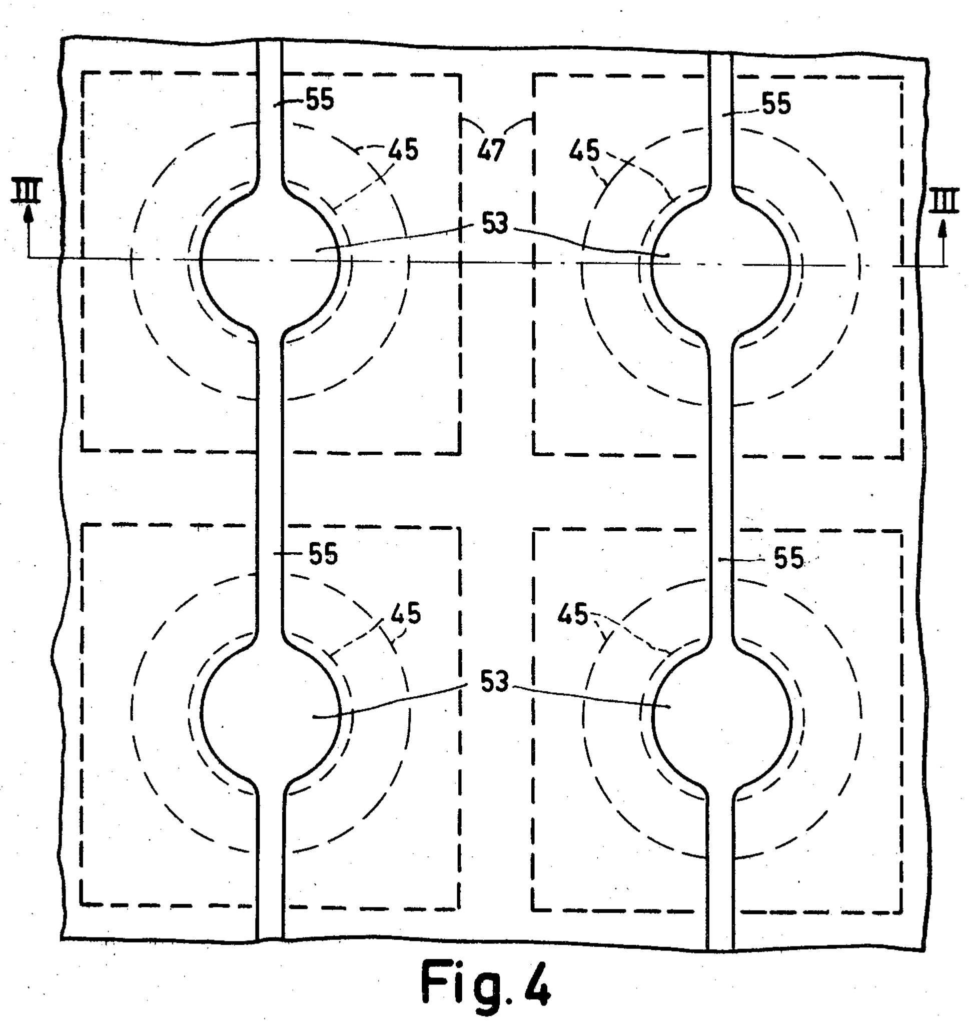

FIGS. 3 and 4 show part of another solid state image intensifier. A semiconductor layer 41 of n-type conductivity, for example of zinc oxide powder in a suitable binder is present and comprises an array of JFET structures, two of which are shown in the cross-section of FIG. 3 and four of which are shown in the plan view of FIG. 4. On the surface of the n-type layer 41 there is an insulating layer 42 of silicon oxide. Each JFET structure comprises a central opening of circular outline in the insulating layer 42 in which a p-type semiconductor layer 43, for example of zinc telluride, extends and forms drain connections 44. Each of said circular openings and drain connections 44 is surrounded at the surface of the layer 41 by an annular gate electrode 45 consisting of a metal layer, for example of platinum, which forms a Schottky junction 46 with the n-type semiconductor layer 41. The gate electrodes 45 are entirely covered by the insulating layer 42. The source electrodes of all the JFET structure are formed by a metal layer grid 47, for example of aluminium, which forms ohmic source connections 48 to the upper surface of the layer 41. The grid 47 is such that the apertures therein are symmetrically disposed with respect to the drain connection 44 lying within the grid 47. The insulating layer 42 covers the grid 47 with the exception of a peripheral part (not shown) to which a lead is connected. On the lower surface of the n-type layer 41 there is a thin metal layer 49, for example of platinum, which forms a Schottky junction with the n-type layer 41. The metal layer 49 is sufficiently thin to allow passage of incident radiation as shown and the layer 41 and applied transmissive metal layer 49 are supported on a glass plate 51 which allows transmission of incident radiation to be intensified and/or converted.

The p-type semiconductor layer 43 which forms the drain connections 44 with the layer 41 also extends on the insulating layer 42 as a continuous layer. Situated on the surface of the p-type layer 43 above each drain connection 44 there is a circular metal layer portion 53 which forms a radiation emissive Schottky junction 54 with the p-type semiconductor layer 43. Further metal layer portions 55 in the form of strips extend on the surface of the p-type layer 43 and interconnect the circular metal layer portions 53. The metal layer portions 53 together with the metal layer portions 55 form a first common terminal for the JFET structure a second common terminal for which is formed by the metal layer grid 47.

In each JFET structure the gate electrode 45 has no direct ohmic connection but is capacitively connected to the drain connection 44. This is achieved due to the p-type layer 43 overlying the insulating layer 42 above the annular gate electrode 46. The gate electrode 46, insulating layer 42 and p-type layer 43 thus constitute a storage capacitor similar to the capacitor 9, 12, 6 of FIG. 2 and the first common terminal constituted by the metal layer portions 53 and 55 thus forms a common connection to each drain connection 44 (via the underlying p-type layer 43) and the side of each storage capacitor remote from the corresponding gate electrode.

In operation the metal layer 49 is connected to the metal layer grid 47 via a variable D.C. bias source. In this manner the Schottky junction between the layer 49 and the layer 41 can be reverse biased if desired. An input pulse source is connected between the aforesaid first and second common input terminals and provides a series of voltage pulses having an interval of for example, 5 milliseconds, between them. The pulses may have a duration of 1 microsecond. The effect of the application of each voltage pulse is to block the channel of each JFET structure. This is achieved because the pulse, hereinafter referred to as the resetting pulse, applied in such a sense that metal layer 53 is positive with respect to the layer grid 47 and each gate Schottky junction comes into forward bias and the MOS storage capacitor formed between it and the layer 43 becomes charged, whereupon on collapse of the pulse the attempted discharge of each MOS storage capacitor forces each gate Schottky junction into reverse bias and a depletion region is formed extending from each said junction into the layer 41. The magnitude and duration of the resetting pulse is chosen such that the depletion regions extend sufficiently far into the n-type layer 41 to block the corresponding JFET channels. In the case of an applied reverse bias between the layers 49 and 41 provided by the aforesaid bias source it is sufficient that the gate junction depletion layer meets the depletion layer associated with the junction between layers 41 and 49. However in the preferred mode of operation referred to hereinafter as the "punch-through" mode there is no bias source present, the metal layer 49 being connected directly to the metal layer grid 47. When each gate Schottky junction depletion region reaches the Schottky junction between layers 49 and 41 the metal layer 49 injects holes into the layer 41 and the gate junction depletion region is thereby limited and extends up to but not beyond the junction between layer 41 and 49.

Following application of the resetting pulse incident radiation absorbed and which generates free charge carriers in each gate junction depletion region or within a diffusion length thereof causes the corresponding depletion region to withdraw thus opening up the corresponding channel. In each interval between resetting pulses the JFET structure will integrate the free charge carriers generated by the incident radiation. During these intervals a read-out potential difference is applied between the first and second common terminals such that the metal layer 53 is positive with respect to the layer grid 47. Said potential difference is preferably applied continuously, the resetting pulses being, for example, added thereto. The result is that an image intensifier action is achieved having appreciable gain due to the amplification provided by each JFET structure. Thus a radiation pattern incident at the lower side of the device as shown in FIG. 3 may be converted into an intensified image produced at the radiation emissive Schottky junctions 54. Radiation is emitted by such a Schottky junction during the application of the read-out potential difference when current conduction occurs between the two common terminals through the channel of the associated JFET structure, said current conduction being dependent upon the extent of the gate depletion region withdrawal produced by the incident radiation. The junctions 54 emit radiation under reverse bias conditions and this corresponds to the polarity quoted for the read-out potential difference. Isolation between adjacent radiation emissive Schottky junctions 54 as achieved due to the p-type layer 43 having a high resistivity.

FIG. 3 shows in broken outline the boundaries of the depletion regions associated with the gate junctions and the Schottky junction between layers 49 and 41 at a certain time between resetting pulses when radiation is incident and has caused the gate depletion region to retract thus opening up the channel. The depletion region associated with the junction between layers 49 and 41 produced when the aforesaid D.C. bias is applied therebetween has a greater thickness below the junction 44 than below the junction 48 due to the lateral voltage drop in the layer 41 between the junctions 44 and 48.

In a modification of the embodiment shown in FIGS. 3 and 4 the semiconductor material of the p-type layer 43 is chosen such that the p-n junctions 44 which constitute the drain connections are radiation emissive p-n junctions under forward bias conditions. In this case the material of the metal layer 53, 55 is chosen such that it makes an ohmic connection to the layer 43 and the portions 53 instead of being of circular area may only be annular. Furthermore the thickness of the layer 43 is appropriately chosen to permit passage of radiation emitted by the junctions 44.

Figure 5:
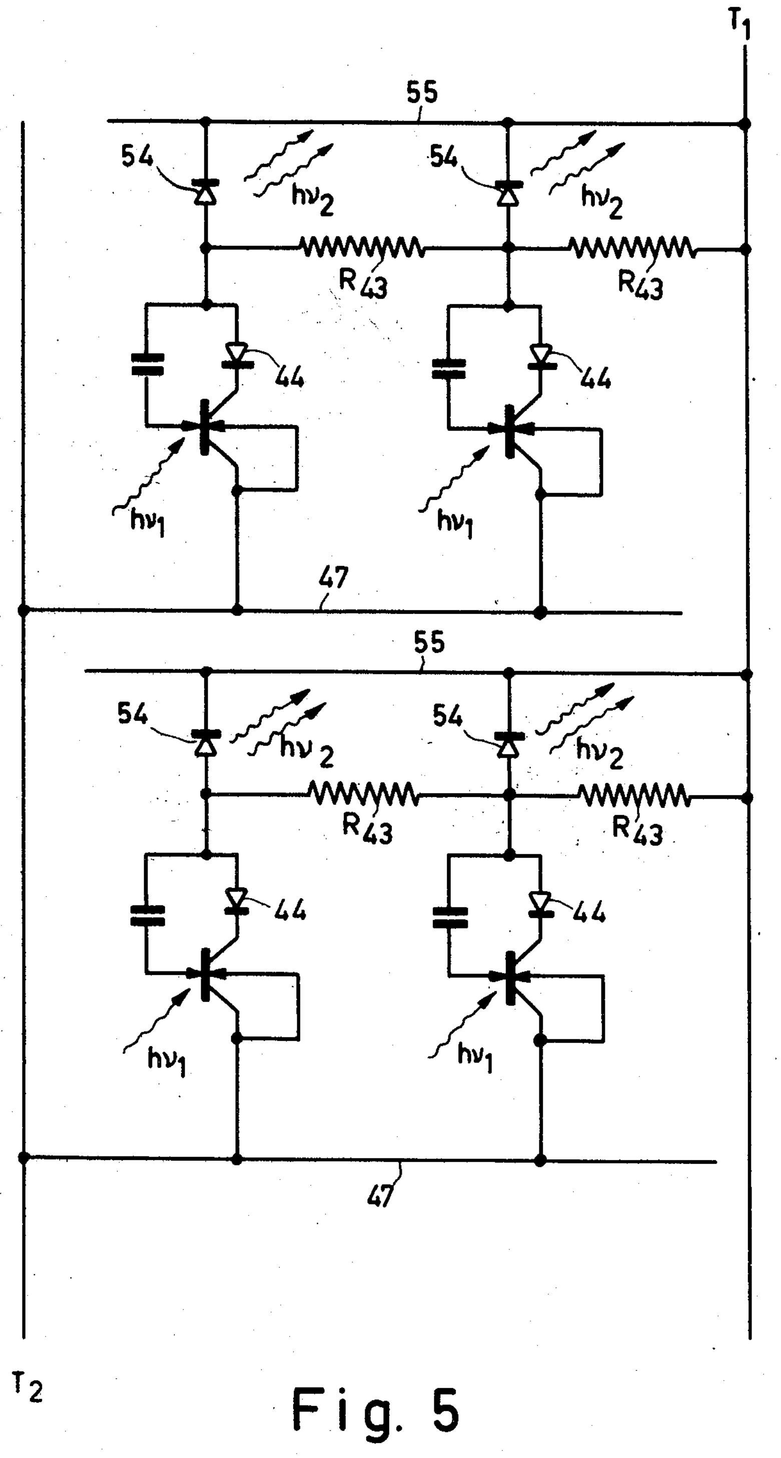
FIG. 5 is an equivalent circuit diagram of the part of the device shown in FIG. 4.

FIG. 5 shows a circuit diagram of the part of the device shown in FIG. 4. The first common terminal connection $T_1$ is formed by the metal layer portions 53, 55 at the upper surface and the second common terminal connection $T_2$ is formed by the metal layer grid 47 connected to the metal layer 49. The drain connections 44 are shown as p-n junction diodes and in the series connection between $T_1$ and the drain connections 44 the radiation emissive Schottky junctions 54 are shown. The resistive isolation of the junctions 54 provided by the layer 43 is indicated by resistors R43.

Figure 6:
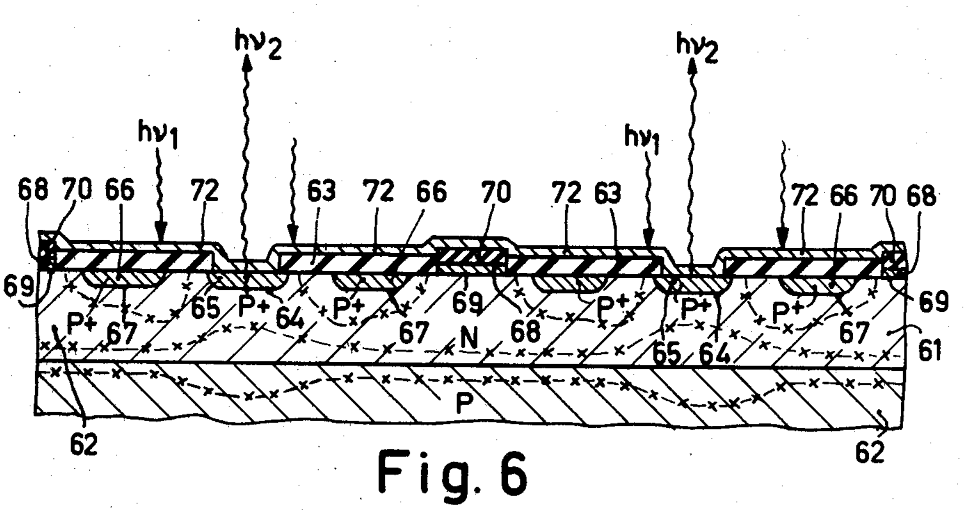
FIGS. 6 and 7 show a cross-section and a plan view respectively (not to scale) of a fourth conversion and display device in which conduction occurs in the lateral direction.
Figure 7:
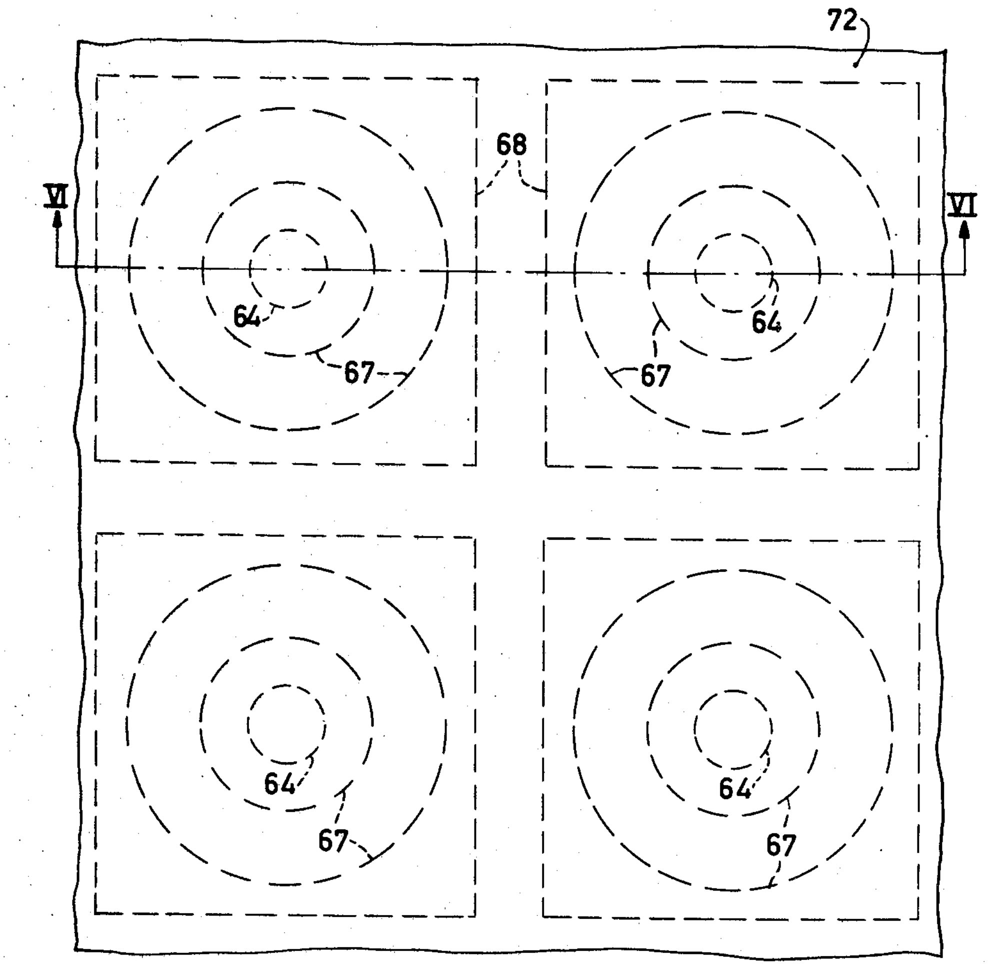

FIGS. 6 and 7 show part of another two terminal solid state image intensifier device. A semiconductor layer 61 of n-type conductivity, for example of gallium phosphide of 5 microns thickness, is present and comprises an array of JFET structures, two of which are shown in the cross-section of FIG. 6 and four of which are shown in the plan view of FIG. 7. The n-type layer 61 is present on a p-type substrate 62, for example of gallium arsenide or gallium phosphide, the layer 61 being an epitaxial layer on the substrate 62. On the surface of the layer there is an insulating layer 63. Each JFET structure comprises a drain connection 64 formed by a p-type surface region 65 of circular outline. The drain connections 64 constitute radiation emissive p-n junctions. Each $p^+$-region 65 is surrounded by an annular $p^+$-surface region 66 constituting a gate electrode region and forming a p-n junction 67 with the n-type layer 61. The source electrodes of all the JFET structures are formed by a metal layer grid 68 applied on the surface of the layer 61 and forming ohmic source connections 69. The apertures in the grid 68 are symmetrically disposed with respect to the $p^+$-regions 65 and 66. For operation in the punch-through mode the source electrode grid is connected to the p-type substrate 62. On the surface of the grid 68 there is an insulating layer portion 70 which covers said grid with the exception of a peripheral portion (not shown) for applying a conductor lead. On the surface of the insulating layer 63, 70 there is a continuous metal layer 72, for example of silver/tin, having a thickness of 200A. The metal layer 72 extends in openings in the insulating layer 63 and forms contact with the $p^+$ regions 65 and constitutes the first common terminal of the JFET structures. The gate electrode region 66 are completely covered by the insulating layer 63 but are capacitively connected to the drain connections 64. This occurs due to the metal layer 72 being situated on the portions of the insulating layer 63 above the $p^+$ gate regions 66, these parts thus forming a storage capacitor. The second capacitor. The second common terminal of the JFET structures is formed by the source electrode metal grid 68 which is connected to the substrate 62.

By simultaneous operation of all the JFET structures in the manner described in the previous embodiment a radiation pattern incident at the upper side of the body may be converted into an intensified image produced by the radiation emissive p-n junctions 64. Radiation is emitted by such a junction during the application of the read-out potential when current conduction occurs between the two common terminals through the channel of the associated JFET structure, said current conduction being dependent upon the extent of the gate depletion region withdrawal produced by the incident radiation. Gain is achieved due to the amplication provided by each JFET structure.

It will appreciated that undesirable optical feedback in the form of the emitted radiation being absorbed and causing further generation of free charge carriers in such manner that further withdrawal of the gate depletion region occurs must be avoided. This can be achieved by providing a suitable spacing of the $p^+$ regions 64 and 66 consistent with maintaining the desired resolution of the device.

Figure 8:
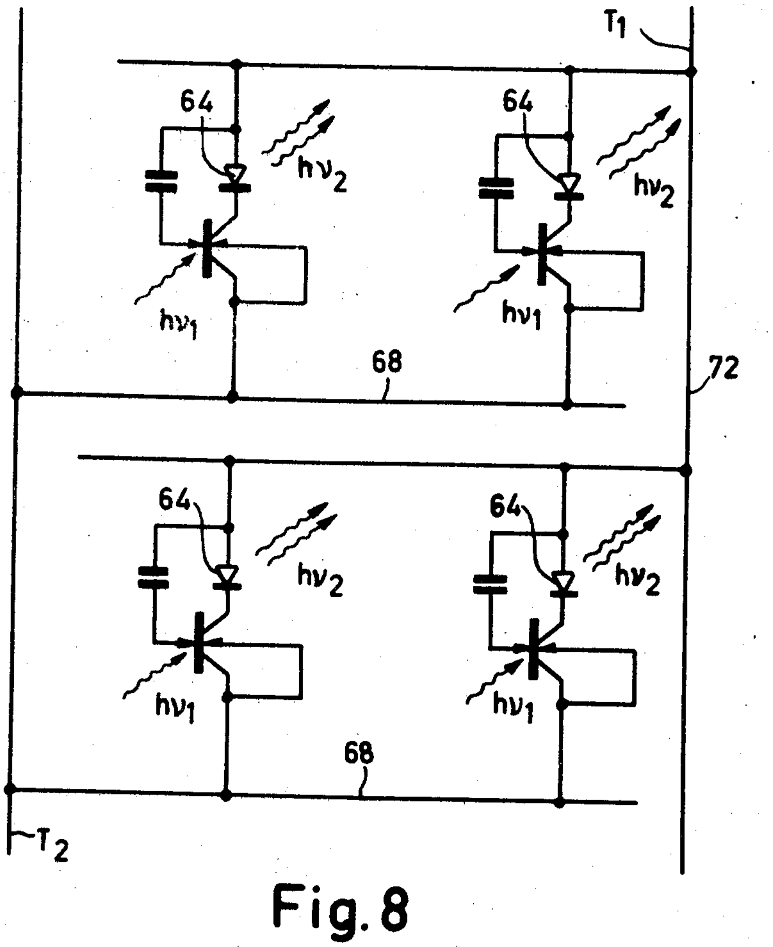
FIG. 8 is an equivalent circuit diagram of the part of the device shown in FIG. 7.

FIG. 8 shows a circuit diagram of the part of the device shown in FIG. 7. The first common terminal $T_1$ is formed by the metal layer 72 at the upper surface and the second common terminal $T_2$ is formed by the metal layer grid 68 which is connected to the p-type substrate 62. The drain connections 64 are shown as radiation emissive p-n junctions diodes.

In modifications of the image intensifier device shown in FIGS. 6 and 7, the structure is such that radiation is incident from the lower side of the layer 61. In one form this is achieved by using a relatively thin p-type substrate of a semiconductor material having a high energy band gap than that of the layer whereby incident radiation to be detected can pass through the substrate and be absorbed in the n-type layer 61. In another form the p-type substrate is replaced by a transmissive metal layer forming a Schottky junction with the n-type layer 61.

It will be appreciated that, with a view to optimising the radiation wavelength response of the devices described which employ an array of lateral JFET structures the substrate/layer p-n junction or Schottky contact junction at the lower side of the semiconductor layer may be reverse biased to produce a depletion region extending into the layer. Furthermore operation with such an applied reverse bias may still be carried out in a punch-through mode in which a higher resetting voltage pulse $V_R$ will be required to cause the gate depletion region to drive the substrate/layer junction or Schottky contact junction depletion region back to said junction.

Other forms of radiation-sensitive field-effect transistor structure arrays may be used in a device according to the invention. For example, an array may be used as described in U.S. Pat. No. 3,721,839, or copending application Ser. No. 398,491, filed Sept. 18, 1973, it being necessary to provide an individual display element such as an electroluminescent element in series with the source and/or drain of each transistor structure of the array. (The embodiments of FIGS. 3 to 8 in fact themselves form part of the disclosure of copending application Ser. No. 398,491).

What we claim is:

1. An imaging display or converter device comprising a common semiconductive layer having opposed major surfaces, an array of junction field effect transistors each having source and drain regions spaced apart by a channel region and each having a separate gate spaced by a barrier junction from a channel region and capable when pulsed of establishing a depletion region in the channel, said channel regions all being located in the said common semiconductive layer, an array of display elements each capable when traversed by electrical current of generating radiation capable of exiting from the device, each of said display elements being electrically connected in series with the source and drain regions of one of the transistors, said array of transistors being mounted such that electromagnetic radiation in the form of an image directed fromoutside from outside array can reach the channels and generate charge carriers in or within a diffusion length of said depletion regions thereby causing contraction thereof in accordance with the intensity of the radiation incident thereon, and means for applying a potential across the array of transistors and array of display elements.

2. A device as claimed in claim 1 comprising means including a common addressing conductor coupled to all the gates for back-biasing the gates to establish the depletion regions in the channels.

3. A device as claimed in claim 2, wherein the gate junctions all lie at one and the same major surface of the common semiconductive layer.

4. A device as claimed in claim 3, wherein each display element comprises part of single layer of electroluminescent material which overlies and electrically contacts the opposite major surface of said semiconductive layer, source and drain connections for each transistor structure both being situated substantially at and electrically contacting that surface of the electroluminescent layer which faces away from the semiconductive layer, the gate junction of each transistor structure overlying the region between the source and drain connections for that transistor structure.

5. A device as claimed in claim 3, wherein the gate junction of each transistor structure is of a configuration for producing a depletion region which surrounds a current path from a source connection to a drain connection for that transistor structure, at least one of said source and drain connections lying substantially at and electrically contacting said same one major surface.

6. A device as claimed in claim 5, wherein the other of said source and drain connections lies substantially at the opposite major surface of the semiconductive layer and electrically contacts it via the associated display element.

7. A device as claimed in claim 5, wherein the said one connection contacts said one major surface via the associated display element.

8. A device as claimed in claim 7, wherein the display element comprises a luminescent P-N junction formed between said common semiconductive layer and a semiconductive material of a conductivity type opposite to that of said common semiconduuctive layer.

9. A device as claimed in claim 7, wherein the display element comprises a luminescent Schottky junction between a metal and the material of the common semiconductive layer.

10. A device as claimed in claim 7 and including a further layer contacting the opposite major surface of the semiconductive layer for producing a depletion region extending into the semiconductive layer.

11. A device as claimed in claim 2, wherein said common addressing conductor also constitutes a common supply conductor for the sources or drains of the transistors.

12. A device as claimed in claim 5, wherein the common addressing conductor also constitutes a common supply conductor for said connections lying substantially at said one major surface.

13. A device as claimed in claim 5, wherein both source and drain connections for each transistor lie substantially at and electrically contact said one major surface.

* * * * *

PO-1050
(5/69)

UNITED STATES PATENT OFFICE
CERTIFICATE OF CORRECTION

Patent No. 3894295 Dated July 8, 1975

Inventor(s) JOHN MARTIN SHANNON ET AL

It is certified that error appears in the above-identified patent and that said Letters Patent are hereby corrected as shown below:

Column 1, line 7, change "section" to -- action --.

Column 2, line 19, change "east" to -- least --.

line 32, before "provided" insert -- gold and maybe --.

Column 3, line 17, change "waere" to -- were --.

Column 8, line 9, delete "The second capacitor".

Column 9, line 25, change "fromoutside" to -- from outside --.

line 26, delete " from outside" and insert -- the --.

Signed and Sealed this

*fourteenth* Day of *October 1975*

[SEAL]

*Attest:*

RUTH C. MASON
*Attesting Officer*

C. MARSHALL DANN
*Commissioner of Patents and Trademarks*